April 24, 1951     A. J. BICKEL     2,549,956
BOOKKEEPING DEVICE
Filed March 5, 1947     2 Sheets-Sheet 1
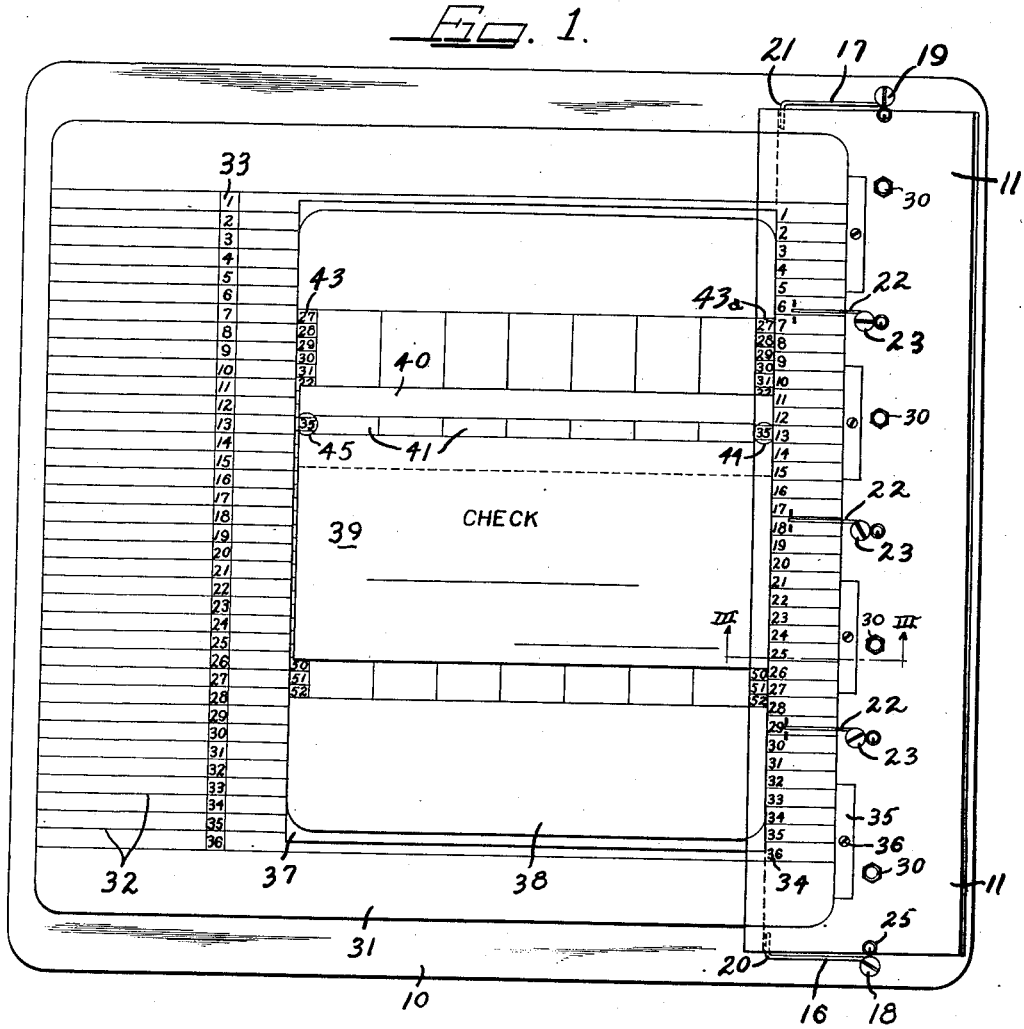
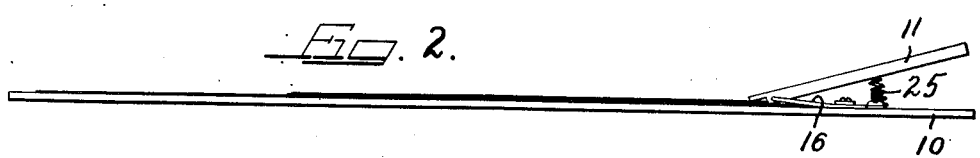
Inventor
ARTHUR J. BICKEL.

Inventor
ARTHUR J. BICKEL

Patented Apr. 24, 1951

2,549,956

UNITED STATES PATENT OFFICE 2,549,956

BOOKKEEPING DEVICE

Arthur J. Bickel, Chicago, Ill., assignor to Accounting Forms, Inc., Chicago, Ill., a corporation of Wisconsin Application March 5, 1947, Serial No. 732,402

11 Claims. (Cl. 282—29)

The present invention relates generally to a bookkeeping device and particularly to a device including a posting board on which a plurality of superimposed sheets may be supported, whereby an entry made on the original may be simultaneously posted on other sheets.

Another object of the present invention is to provide a bookkeeping device wherein an original entry made on one sheet may be simultaneously duplicated on other sheets, which other sheets may be separated to form different parts of permanent records.

A further object of the present invention is to provide a bookkeeping device which includes a posting board on which a plurality of superimposed sheets may be clamped and may be moved together on the board without danger of misaligning them.

Generally speaking the device of the present invention contemplates a posting board having a side or margin clamp that includes a transparent plate. With the board is used a lined record sheet having a line index along one side margin, which sheet is clamped to the board by the transparent plate in such manner that the line index on the sheet is visible through the plate. The invention also contemplates novel means for supporting the clamping plate for rocking action about different fulcra at different stages of its use to facilitate manipulation and alignment of the work.

The above, other and further objects of the present invention will be apparent from the following description and accompanying drawings.

An embodiment of the present invention is illustrated on the accompanying drawings and the views thereof are as follows:

Figure 1 is a plan view of a board of the present invention having superposed thereon a summary sheet, a ledger sheet and a check, and illustrating the arrangement of the various sheets on the board for alignment of the various sheets when an original entry is to be made on the uppermost sheet or check.

Figure 2 is an end view of the arrangement of Figure 1 looking at the bottom of the board as illustrated in Figure 1.

According to the drawings, a posting board 10 is provided, which may be of any suitable size, shape or material.

A clamp plate 11, which is of transparent material, such for example as "Lucite," and generally oblong in shape is mounted adjacent a side margin of the board. In the present instance the clamp plate is illustrated as mounted adjacent or along the right hand edge of the board 10 with the length of the plate parallel to the right hand edge of the board.

Figure 3:
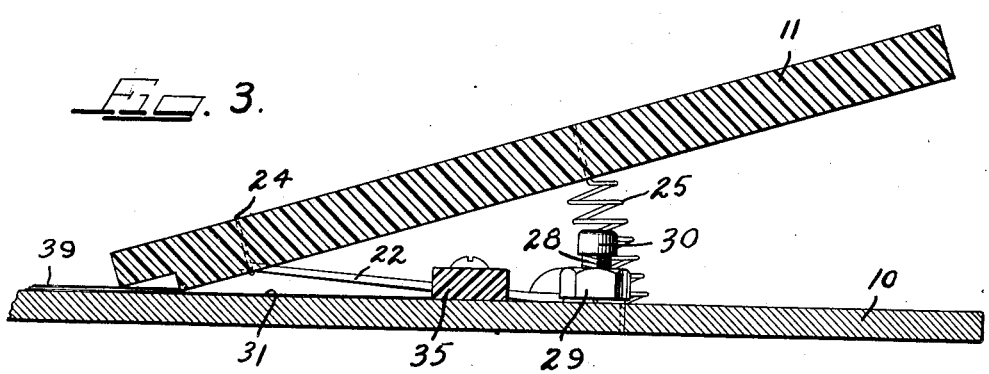
Figure 3 is an enlarged fragmental cross sectional view taken on the plane of line III—III of Figure 1 and showing all of the sheets clamped against the board by the clamp plate.
Figure 4:
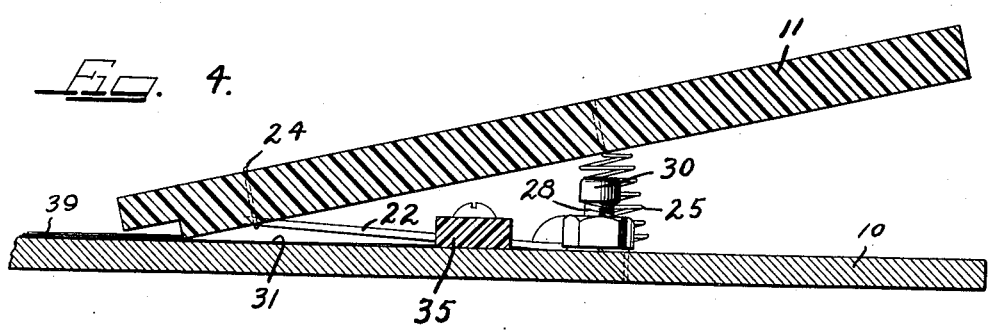
Figure 4 is a view similar to Figure 3 showing the clamp plate rocked on one fulcrum to release holding engagement of certain of the sheets while maintaining holding engagement of the lowermost or record sheet.
Figure 5:
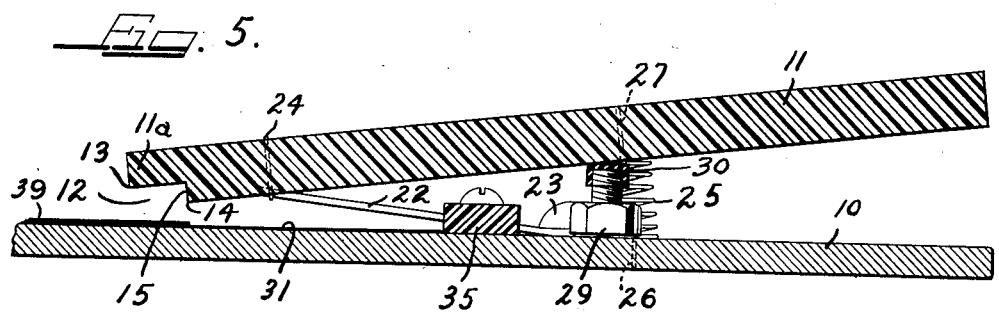
Figure 5 is a similar view showing the clamp plate rocked on its second fulcrum to disengage it from holding engagement with all of the sheets on the board.

The inner, or left hand margin of the clamp plate 11, is rabbeted or notched at 12 lengthwise of the plate in the lower surface thereof, as may be observed in Figures 3, 4 and 5. The notch or rabbet 12 forms an overhang 11a and two longitudinally extending parallel shoulders or edges 13 and 14, sometimes mentioned as grip or holding edges.

Referring to Figures 3 to 5 inclusive the edge 13, for convenience, will herein be termed the outer edge while the edge 14 will be termed the inner edge. It will be noted that the inner edge 14 is formed at the junction of the lower face of the plate 11 and the shoulder 15 of the notch, and that the outer edge 13 is above the inner edge 14 as a part of the overhang 11a and also is above the lower face of the plate 11, when observing the plate in the manner shown in the drawings. The plate 11 may be hingedly mounted on the board by means of spring hinges 16 and 17 which are fastened at similar ends by suitable means such as screws 18 and 19, through the board adjacent the ends of the plate 10, as may be noted in Figure 1. The other ends of the hinge springs are bent towards each other as at 20 and 21 respectively, which bent ends as pintles are entered in apertures formed in the ends of the plate adjacent the inner edge 14. The hinge springs 16 and 17 are tensioned so as to normally urge the inner edge 14 against the board.

Should the hinge springs 16 and 17 be inadequate to tightly hold the inner edge 14 against the board, throughout the length of the plate 11, additional springs 22 may be provided. The springs 22 may be of wire suitably tensioned and attached to the board at similar ends by fastening means such as screw 23. The other ends of the springs 22 enter stirrups 24 inserted in the plate 11, adjacent the inner edge 14, with the upper ends of the stirrups against the upper surface of the plate and the loops of the stirrups below the lower face of the plate to receive the free ends of the springs 22. Figures 3, 4 and 5 show the manner of connection of the springs 22 to the stirrups 24.

Between the plate 11 and the underlying portion of the board 10, and at spaced intervals in the length of the plate, are coiled springs 25 acting against the plate to urge it away from the board and which springs constitute means cooperating with the springs 16, 17 and 22 to hold the edges 13 and 14 of the plate 11 against the board and the plate in tilted position.

The springs 25 are shown as attached to the board by similar ends 26 thereof entered in suitable apertures in the board, the other ends 27 thereof being entered in suitable apertures in the plate 11.

Secured in the board 10 and spaced one from another throughout the length of the plate 11 are bolts 28 which may be threaded into the board 10 and held in place thereon by nuts 29. Every bolt 28 is covered by a resilient cap 30 of rubber or other suitable resilient material. The bolts 28 are so mounted in the board 10 that in normal operation of the clamp the plate 11 is spaced from the bolts by the springs 25. The bolts 28 constitute a second fulcrum for the plate.

A record sheet 31 is used with the board 10.

The record sheet 31 is illustrated as having a plurality of lines 32 printed on it while all of the lines are consecutively numbered as at 33 near one margin of the sheet which is shown as the left hand margin in the drawings. Along at or near the right hand margin of the sheet is a line number guide 34 which is the same as the line number 33 so that the numbers of the lines on the record sheet may be readable adjacent either or both of the side margins.

Secured to the board 10 underneath the clamp plate 11 are stops 35 disposed to have similar edges in alignment which edges are parallel to the edges 13 and 14 of the plate. The stops 35 are shown arranged on the board 10 with their aligned edges spaced from the inner edge 14 of the plate 11 such a distance that when the record sheet 31 is inserted under the clamp the line number guide 34 will be visible through the plate adjacent the inner edge 14, as may be readily observed in Figure 1.

When the record sheet 31 is applied to the board the clamp plate 11, that is the upper margin thereof, is depressed against the bolts 28 and the resilient caps thereon and rocked thereon as a fulcrum to lift the edges 13 and 14 of the plate clear off the board so that the record sheet 31 may then be pushed underneath the edge 14 of the plate and against the stops 35, as shown in Figure 1, to thus position the sheet on the board. After the sheet has been moved against the stops 35, hand pressure on the plate 11 is released whereupon the springs 25 and the springs 16, 17 and 22 move the edges 13 and 14 of the plate against the record sheet in clamping engagement.

A carbon sheet 37 is laid on the record sheet 31 and its right hand margin moved against the shoulder 15 of the notch, as stop, when the outer edge 13 of the clamp plate is raised. To raise the outer edge 13 of the clamp plate without raising the inner edge 14, hand pressure is applied to the upper margin of the plate 11 to rock the plate on the inner edge 14 as a fulcrum and raise the outer edge 13 from against the board or the record sheet 31, as the case may be, to approximately the position shown in Figure 4. When the outer edge 13 is raised in the manner stated, by rocking the plate on the inner edge 14 as a fulcrum, the carbon sheet 37 and other sheets may be inserted underneath the outer edge 13 of the plate and against the shoulder 15 of the notch as a stop.

The drawings show sheets marked for making a payroll record.

The record sheet 31 may constitute a payroll record for any given pay period.

A ledger sheet 38 which, in the case of a payroll, would be made out in the name of an employee, and a check 39, which is a paycheck for that particular employee for the particular pay period are then inserted on top of the carbon sheet 37, underneath the outer edge 13 of the clamp plate when said edge has been raised in the manner heretofore described and as illustrated in Figure 4.

Figure 1 shows the ledger sheet 38 and check 39 arranged to have the entries made on line 13 of the record sheet. It is to be presumed that lines 1 to 12 inclusive have been filled with the names and other data relating to twelve other employees.

Along the top margin of the check 39 and tearable therefrom is a tear off portion 40 which portion is imprinted with spaces 41 in endwise alignment lengthwise of the check and in width substantially the same as the distance between any two lines 32 of the record sheet 31.

The ledger sheet 38 has a column 43 of numbers along its left hand margin, which are consecutively arranged to designate pay periods. A similar column of numbers 43a is arranged along the right hand margin of the ledger sheet in such manner that when the ledger sheet is inserted under the clamp plate 11 the numbers in the column 43a will be visible through the plate 11 between the edges 13 and 14 of the same, as may be noted in Figure 1. In order to align the check 39 so that the spaces 41 of its tear off portion are in register with the number of a particular payroll period and also with the proper line of the record sheet 31, the right and left hand ends of the tear off portion 40 are notched respectively at 44 and 45, the notch 44 exposing a number in the column 43a and the notch 45 exposing the same number in the column 43 of the ledger sheet.

When the sheets are arranged and aligned as shown in Figure 1, suitable entries are made in the spaces 41 of the tear off portion 40 of the check, preferably by use of a pen, such entries are reproduced on the ledger sheet and the record sheet. The undersurface of the tear off portion 40 of the check is preferably provided with carbon material underlying the spaces 41 so that entries made in the spaces 41 of the check will be reproduced on the ledger sheet by reason of such carbon. The same data also will be reproduced in line 13 of the record sheet 31 by means of the carbon sheet 37 between the ledger sheet and the record sheet.

When a check and a ledger sheet have been duly inscribed in the spaces 41, the clamp plate 11 is rocked on its lower edge 14 as a fulcrum to raise the outer edge 13 to allow removal of the ledger sheet and check and prevent the removal of the record sheet and carbon paper.

Thereafter the ledger sheet and check for another employee are inserted, this time aligned with line 14 of the record sheet whereupon the process is repeated.

It will be noted that as entries are made on the record sheet, towards its bottom, there may not be sufficient of the board exposed on which the writer may rest his hand. In such event clamp plate 11 may be rocked on the bolts 28 as a fulcrum to lift both of the edges 13 and 14 from the sheet whereupon the record sheet and check may be moved up or down on the board, preferably up so that the writer will have a sufficient rest for his hand to complete entries on the record sheet. Such movement of the sheets may be made without misaligning them during such movement and with full assurance of alignment when the clamp plate is released to clamp all of the sheets against the board with the record sheet against the stops 35.

The fact that the clamp plate 11 is transparent makes this feature possible. It is to be noted that after the record sheet and carbon sheet have been inserted against the stops 35 by raising the edge 14 of the plate above the board, which raising is accomplished by tilting the plate on the bolts 23 as a fulcrum, the only movement of the plate necessary thereafter to enable insertion and removal of the ledger sheet and check is by slight rocking movement of the clamp plate on the edge 14 as a fulcrum.

Because of the novel fulcrum arrangement of the present invention, slight hand pressure is required to lift the outer edge 13 of the plate from the ledger sheet and check. The fact that the springs 25 tend to urge the edges against the board, thus maintain edge 14 against the register 31 and carbon sheet 37 while the outer edge 13 is being elevated for insertion and removal of the ledger sheet and check.

Figure 6:
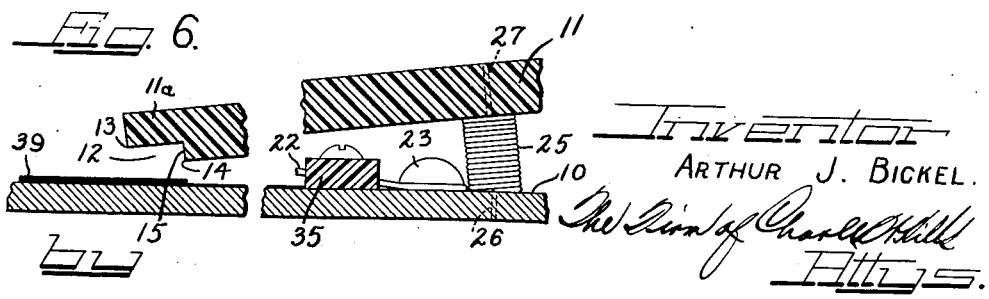
Figure 6 is a fragmental sectional view of the plate rocked on a compressed spring as a fulcrum.

Figure 6 shows how the posting board of the present invention could be arranged to use the springs 25 when compressed as a fulcrum, which construction would eliminate the need for other means as a fulcrum.

Other means than the bolts 23 might be used for the fulcrum for tilting the edge 14 away from the board 10.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. A bookkeeping device comprising a posting board, a clamp for removably holding a plurality of superimposed sheets on said board, said clamp including a rockable plate, spring means for holding one margin of said plate against said board, other spring means for holding the other margin of said plate away from said board in tilted position, said plate having a fulcrum edge along said one margin thereof about which said plate may rock, and means engaging the ends of said plate to prevent any but rocking movement with respect to the board.

2. A bookkeeping device comprising a posting board, a clamp for removably holding a plurality of superimposed sheets on said board, said clamp including a rockable plate, spring means for holding one margin of said plate against said board, other spring means for holding the other margin of said plate away from said board in tilted position, said one margin being rabbeted along its underside to provide an overhang and two parallel edges lengthwise of the plate with one of said edges as a part of said overhang, the other of said edges constituting a fulcrum on which said plate may be rocked to raise said one edge from the board when pressure is applied to the plate near its other margin.

3. A bookkeeping device comprising a posting board, a clamp for removably holding a plurality of superimposed sheets on said board, said clamp including a rockable plate, spring means for holding one margin of said plate against said board, other spring means for holding the other margin of said plate away from said board in tilted position, said one margin being rabbeted along its underside to provide an overhang and two parallel edges lengthwise of the plate with one of said edges as a part of said overhang, the other of said edges constituting a fulcrum on which said plate may be rocked to raise said one edge from the board when pressure is applied to the plate near its other margin, means on said board underlying said plate to constitute a second fulcrum, said other spring means normally holding said plate away from said second fulcrum, said second fulcrum being effective to raise said first fulcrum from the board when pressure is applied to said plate near its other margin in an amount sufficient to move said plate against said second fulcrum.

4. A bookkeeping device comprising a posting board, means for holding groups of superimposed sheets on said board, said means including a rockable plate having laterally spaced parallel edges along a margin thereof, one edge being an outer edge and the other edge being an inner edge, spring means for holding said plate in tilted position with both of said edges against said board, fulcrum means effective to cause rocking of said plate to raise both edges from the board for insertion of a sheet underneath the inner edge, said inner edge constituting another fulcrum for raising only the outer edge from the board for insertion of a sheet underneath the outer edge only and superimposed on said first sheet, and stop means for limiting the extent of insertion of said first sheet underneath said inner edge, said inner edge also serving to limit the extent of insertion of said second sheet under the said outer edge.

5. A bookkeeping device comprising a posting board, a clamp on said board comprising a plate of transparent material rockably mounted on said board and having a side margin thereof spring urged into contact with said board, said side margin being rabbeted upwardly from the bottom face of said plate to provide two parallel edges lengthwise of said plate and constituting an inner holding edge and an outer holding edge, hinge means connected to the ends of said plate, means exerting spring action on said plate to hold said inner edge against the board, and other means acting against the bottom surface of said plate to tilt the other side margin thereof away from the board, said last means being elastic to be compressed when said plate is rocked on said inner holding edge as a fulcrum to raise the outer holding edge from the board.

6. A bookkeeping device comprising a posting board, a clamp on said board comprising a plate of transparent material rockably mounted on said board and having a side margin thereof spring urged into contact with said board, said side margin being rabbeted upwardly from the bottom face of said plate to provide two parallel edges lengthwise of said plate and constituting an inner holding edge and an outer holding edge, hinge means connected to the ends of said plate, means exerting spring action on said plate to hold said inner edge against the board, and other means acting against the bottom surface of said plate to tilt the other side margin thereof away from the board, said last means being elastic to be compressed when said plate is rocked on said inner holding edge as a fulcrum to raise the outer holding edge from the board, and means constituting a second fulcrum on which said plate may be rocked to raise said inner holding edge from said board, said last mentioned means normally holding said plate away from said second fulcrum means.

7. A clamp board for holding a record sheet, a clamp comprising a member having a length substantially that of the height of the board and disposed along an end of the board, said member being formed to provide two corner edges extending lengthwise thereof in vertically offset relationship, spring means for pressing the lower of said edges against the board, hinge means having pintles entered in the ends of said member adjacent the lower of said edges to thereby constitute said edge a fulcrum, said member being rockable about said fulcrum to raise the upper edge of the board for insertion and removal of sheets, means providing a second fulcrum remote from the first fulcrum about which the lower edge may be raised from the board when sufficient pressure is applied to the plate, a second spring means acting against said plate to normally space it from said second fulcrum.

8. A posting board for bookkeeping, comprising a holddown plate disposed along a side margin of the board and supported for rocking movement, said plate being rabbeted along its inner margin to provide two parallel edges lengthwise of the plate with one edge above the other with respect to the bottom of the plate, hinge connections at the ends of the plate adjacent said other or lower edge, said hinge connections being spring tensioned to normally hold said lower edge against the board as a fulcrum, and other spring means acting against said plate to tilt it with respect to the board to hold the upper edge against the board by rocking it about said lower edge as a fulcrum.

9. A book or record keeping device comprising in combination, a posting board adapted to receive a record sheet, a clamp plate tiltably mounted along a side margin of said board, spring means for maintaining the inner underside margin of said plate against the board, the inner underside margin of said plate being rabbeted to provide parallel edges extending lengthwise of the plate and in different planes with respect to the bottom surface of the plate and to provide a stop spaced from the inner side edge of the plate, hinge means engaging the ends of said plate adjacent the stop thereof, said hinge means including spring means acting to hold the inner of said edges against the board surface as a fulcrum, other spring means effective lengthwise of the plate and engageable therewith substantially medially thereof to elevate the outer edge of the plate and to hold the plate in tilted position, said other spring means being compressible when the plate is rocked on said first fulcrum by hand pressure applied to the outer margin of the plate, bumper means on the board underneath said plate and underlying said plate lengthwise thereof with the plate normally spaced above said bumper means by said other spring means, said bumper means constituting a second fulcrum to lift said first fulcrum from the board when excessive hand pressure is applied to the outer margin of the plate to force the plate against the bumper means in opposition to the resistance offered by said first and second spring means.

10. A book or record keeping device comprising in combination, a posting board adapted to receive a record sheet, a clamp plate tiltably mounted along a side margin of said board, spring means for maintaining the inner underside margin of said plate against the board, the inner underside margin of said plate being rabbeted to provide parallel edges extending lengthwise of the plate and in different planes with respect to the bottom surface of the plate and to provide a stop spaced from the inner side edge of the plate, hinge means engaging the ends of said plate adjacent means engaging the ends of said plate adjacent the stop thereof, said hinge means including spring means acting to hold the inner of said edges against the board surface as a fulcrum, other spring means effective lengthwise of the plate and engageable therewith substantially medially thereof to elevate the outer edge of the plate and to hold the plate in tilted position, said other spring means being compressible when the plate is rocked on said first fulcrum by hand pressure applied to the outer margin of the plate, bumper means on the board underneath said plate and underlying said plate lengthwise thereof with the plate normally spaced above said bumper means by said other spring means, said bumper means constituting a second fulcrum to lift said first fulcrum from the board when excessive hand pressure is applied to the outer margin of the plate to force the plate against the bumper means in opposition to the resistance offered by said first and second spring means, and abutment means on said board underneath said plate and disposed thereon between the first and second fulcra to serve as a stop for contact by a record sheet insertable under the inner margin of said plate when said plate has been rocked on the bumper means to raise the first fulcrum from the board.

11. A bookkeeping device comprising a posting board, a clamp for removably holding a plurality of superimposed sheets on said board, said clamp including a rockable plate, spring means for holding one margin of said plate against said board, other spring means for holding the other margin of said plate away from said board in tilted position, said one margin being rabbeted along its underside to provide an overhang and two parallel edges lengthwise of the plate with one of said edges as a part of said overhang, the other of said edges constituting a fulcrum on which said plate may be rocked to raise said one edge from the board when pressure is applied to the plate near its other margin, said other spring means when tightly compressed constituting a fulcrum for raising the other of said edges from the board as the plate is depressed along its other margin.

ARTHUR J. BICKEL.

REFERENCES CITED

The following references are of record in the file of this patent:

UNITED STATES PATENTS

| Number | Name | Date |
|---|---|---|
| 963,556 | Hill | July 5, 1910 |
| 1,463,929 | Taylor | Aug. 7, 1923 |
| 1,669,809 | Card et al. | May 25, 1928 |
| 2,095,838 | Semmler et al. | Oct. 12, 1937 |
| 2,381,197 | Zalkind | Aug. 7, 1945 |

FOREIGN PATENTS

| Number | Country | Date |
|---|---|---|
| 171,399 | Switzerland | Nov. 1, 1934 |
| 246,482 | Switzerland | Jan. 15, 1947 |